(12) United States Patent
Chen et al.

(10) Patent No.: US 8,804,612 B1
(45) Date of Patent: Aug. 12, 2014

(54) TRIGGERING AND TRANSMITTING SOUNDING PACKETS FOR WIRELESS COMMUNICATIONS

(75) Inventors: Chin-Hung Chen, Taiwan (TW); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 12/542,642

(22) Filed: Aug. 17, 2009

Related U.S. Application Data

(63) Continuation-in-part of application No. 12/367,119, filed on Feb. 6, 2009.

(51) Int. Cl.
*H04W 4/00* (2009.01)
*H04B 7/04* (2006.01)
*H04B 7/06* (2006.01)

(52) U.S. Cl.
CPC ............ *H04B 7/0456* (2013.01); *H04B 7/0404* (2013.01); *H04B 7/0626* (2013.01); *H04B 7/0634* (2013.01); *H04B 7/0452* (2013.01)
USPC ............ 370/328; 370/252; 370/329; 375/267

(58) Field of Classification Search
None
See application file for complete search history.

(56) References Cited

U.S. PATENT DOCUMENTS

| | | | |
|---|---|---|---|
| 6,075,484 A * | 6/2000 | Daniel et al. ................ | 342/372 |
| 6,449,266 B1 * | 9/2002 | Hottinen et al. ............ | 370/342 |
| 6,895,253 B1 * | 5/2005 | Carloni et al. ............. | 455/506 |
| 6,917,820 B2 | 7/2005 | Gore et al. | |
| 7,239,893 B2 | 7/2007 | Yang | |
| 7,400,907 B2 | 7/2008 | Jin et al. | |
| 7,746,943 B2 | 6/2010 | Yamaura | |
| 7,747,250 B2 | 6/2010 | Larsson et al. | |
| 7,920,533 B2 | 4/2011 | Koo et al. | |
| 8,175,538 B1 | 5/2012 | Chen et al. | |
| 8,295,263 B1 | 10/2012 | Chen et al. | |
| 2002/0159506 A1 * | 10/2002 | Alamouti et al. ............ | 375/147 |
| 2003/0096618 A1 * | 5/2003 | Palenius .................... | 455/453 |
| 2005/0002353 A1 * | 1/2005 | Horneman .................. | 370/329 |
| 2005/0141545 A1 | 6/2005 | Fein et al. | |
| 2005/0287978 A1 * | 12/2005 | Maltsev et al. ............. | 455/403 |
| 2006/0098580 A1 | 5/2006 | Li et al. | |
| 2006/0166635 A1 * | 7/2006 | Kitayama et al. .......... | 455/277.2 |
| 2006/0252386 A1 * | 11/2006 | Boer et al. .................. | 455/101 |
| 2007/0195974 A1 * | 8/2007 | Li et al. ...................... | 381/94.3 |
| 2007/0218950 A1 * | 9/2007 | Codreanu et al. .......... | 455/562.1 |
| 2007/0286303 A1 | 12/2007 | Yamaura | |
| 2008/0247370 A1 | 10/2008 | Gu et al. | |
| 2009/0080560 A1 | 3/2009 | Na et al. | |
| 2009/0086690 A1 | 4/2009 | Gu et al. | |
| 2009/0196372 A1 | 8/2009 | Zhang et al. | |
| 2010/0172425 A1 | 7/2010 | Pare, Jr. et al. | |
| 2011/0150066 A1 | 6/2011 | Fujimoto | |

\* cited by examiner

*Primary Examiner* — Kibrom T Hailu
*Assistant Examiner* — James P Duffy
(74) *Attorney, Agent, or Firm* — Holland & Hart LLP

(57) ABSTRACT

The antenna configurations of a wireless communications system including a beamformer and beamformee may be changed. In an improved technique for triggering a sounding packet, notification of an antenna re-configuration, either at the beamformer or the beamformee can be quickly used by the beamformer to trigger the sounding packet. In one embodiment, the beamformee can perform its own computations to determine a changing channel. In this embodiment, once a changing channel is detected, the beamformee can notify the beamformer to trigger the sounding packet.

13 Claims, 9 Drawing Sheets

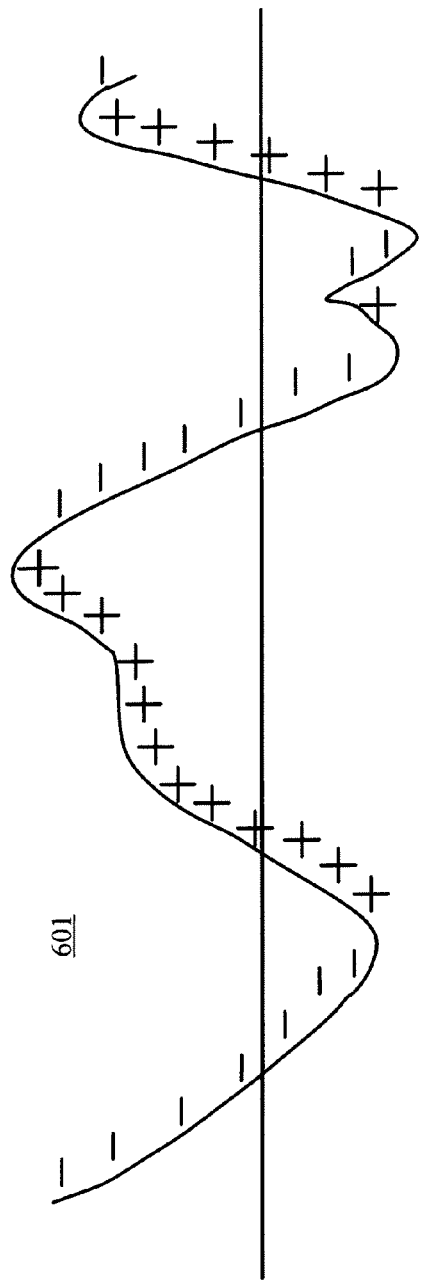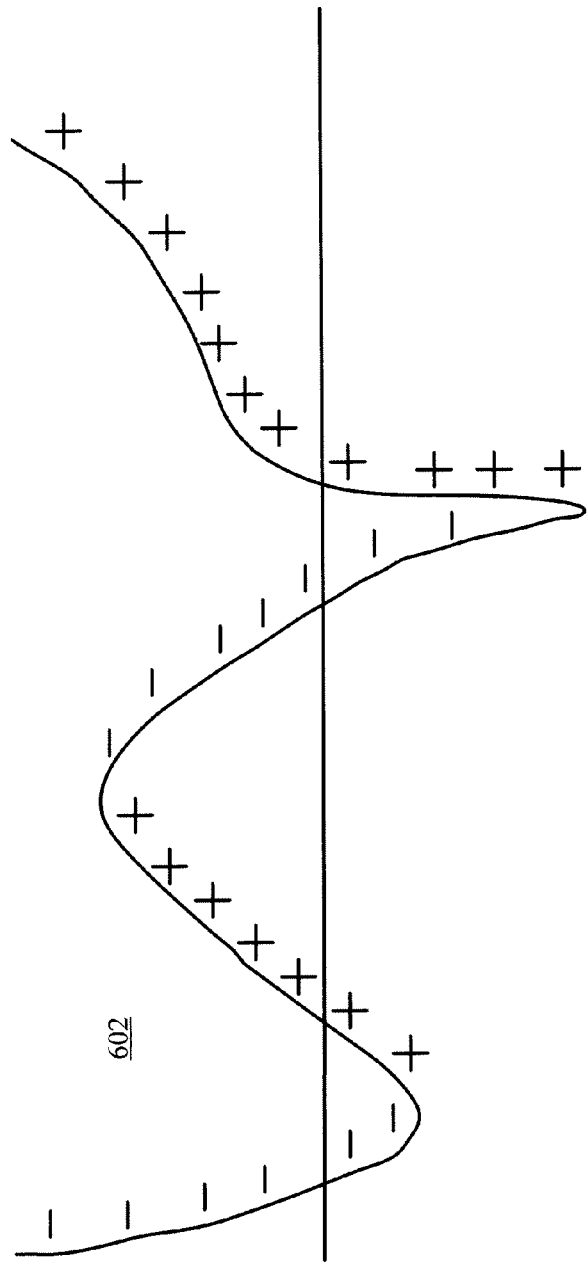
FIG. 6A
FIG. 6B

TRIGGERING AND TRANSMITTING SOUNDING PACKETS FOR WIRELESS COMMUNICATIONS

RELATED ART

The present application is a continuation-in-part application of U.S. patent application Ser. No. 12/367,119, entitled "Triggering And Transmitting Sounding Packets For Wireless Communications", filed on Feb. 6, 2009, which is incorporated by reference herein.

The present application is related to U.S. patent application Ser. No. 12/334,799, entitled "Calibrating A Wireless Communication Device", filed on Dec. 15, 2008, which is incorporated by reference herein.

BACKGROUND OF THE INVENTION

1. Field of the Invention

The present invention generally relates to wireless communications, and more particularly to an apparatus and method for determining when to trigger and transmit sounding packets used to characterize the channel in a transmit beamforming system.

2. Description of the Related Art

Transmit beamforming (TxBF) technology entails using multiple, separate antennas to transmit single or multiple signal streams to a receiver. The raw data signals are properly weighted and combined for each of the transmitter's antennas so that a transmit beam is formed and directed to the receiver. The intent is to have all of the transmitted raw data signals from the multiple antennas coherently combine at the receiver. By tightly focusing the wireless data signals at the receiver, the transmitter's range is effectively extended and higher data rates are made possible.

In practice, the wireless data signals can encounter a variety of scatters. Sources of scattering are unpredictable and variable in nature. For example, objects (e.g. buildings, walls, furniture, fixtures, etc.) in the way of a wireless data signal may cause the wireless data signal to be reflected in multiple, different directions. As a result, the original transmitted wireless data signal may ultimately reach the receiving antenna by way of two or more different paths. This propagation phenomenon is referred to as "multipathing." Conventionally, scattering is treated as a problem because a single transmitted wireless signal can exhibit different delays (e.g. phases) and magnitudes as experienced by the receiver, depending on the different paths that were traveled.

Although scattering and multipathing cannot be eliminated, their effects can be measured and then factored into the calculations when determining the beamforming matrix. For example, a specific channel's information can be measured. Based on that channel's information, the transmitter can pre-process the raw data signals so as to utilize the specific channel characteristics. One method for determining the channel characteristics is set forth by the Institute of Electrical and Electronics Engineers (IEEE) in 802.11n. In 802.11n, a set of standards is defined for wireless networking (e.g. Wi-Fi) that is widely adopted by the wireless communications industry. In 802.11n, sounding packets are transmitted to the receiver. The sounding packets contain training symbols that, upon receipt by the receiver, are interpreted to characterize the channel. Based on the calculated channel characteristics, a beamforming matrix or vector can be applied to weight and combine the raw data signals. Using the beamforming matrix, the wireless data signals can be coherently combined at the receiver, even in the presence of scattering and multipathing.

Under some operating conditions, the environment is fairly static (e.g. indoors). In these cases, the originally calculated channel characteristics are slowly varying over time. Therefore, these channel characteristics can be used over relatively long periods of time with minor or negligible performance degradation. Consequently, the times between re-transmitting sounding packets to update the channel characteristics can be extended.

However, there may be operating conditions in which the environment is rapidly changing, i.e. the channel characteristics significantly changing from one moment to the next. In these circumstances, sounding packets should be more frequently re-transmitted to ensure accurate, up-to-date channel characteristics. Otherwise, the performance may suffer to the point of losing the benefits of TxBF altogether.

Unfortunately, transmitting sounding packets consume valuable bandwidth. Specifically, user data cannot be sent while sounding packets, sounding long training fields (LTFs), or feedbacks to sounding packets (e.g. CSI/V/CV, described below) are being transmitted.

As a result, TxBF designers are faced with a dilemma. On the one hand, transmitting fewer sounding packets reserves airtime to be better utilized for the transmission of user data. The downside is that performance may suffer, especially in a rapidly changing environment. On the other hand, the frequent transmissions of sounding packets lead to improved performance. However, frequent transmissions of sounding packets consume valuable bandwidth. Further complicating matters is that an otherwise stable operating environment may occasionally undergo abrupt and rapid changes. Conversely, a rapidly changing environment may encounter periods of stability. Moreover, the TxBF system could be moved from a stable environment to a rapidly changing environment or vice versa. Thus, a need arises for an improved TxBF technique that efficiently triggers sounding in a changing environment.

SUMMARY OF THE INVENTION

Notably, the antenna configurations of a wireless communications system including a beamformer and beamformee may be changed. In an improved technique for triggering an update of a beamforming matrix, notification of an antenna re-configuration, either at the beamformer or the beamformee can be quickly used by the beamformer to trigger the update of a beamforming matrix update. In one embodiment, the beamformee can perform its own computations to determine a changing channel. In this embodiment, once a changing channel is detected, the beamformee can notify the beamformer to trigger the update of a beamforming matrix.

In the beamformer, a method for triggering an update of a beamforming matrix can include determining channel estimates based on predetermined signals from the beamformee, determining whether an antenna configuration at the beamformer has changed, determining whether a channel between the beamformer and the beamformee has changed based on a correlation of most recent channel estimates, and determining whether the beamformer has received an advance notice from the beamformee. When the antenna configuration at the beamformer has not changed, the channel has not changed, and the beamformer has not received advance notice, then the beamformer can continue determining channel estimates based on the predetermined signals from the beamformee. In contrast, when at least one of the antenna configuration at the beamformer has changed, the environment has changed, and the beamformer has received advance notice, then the beamformer can trigger an update of the beamforming matrix.

In one embodiment, the advance notice can be triggered based on an antenna configuration at the beamformee changing. In another embodiment, the advance notice can be triggered based on the beamformee detecting a changing channel.

In the beamformee, the method can include determining channel estimates based on signals from the beamformer, determining whether an antenna configuration at the beamformee has changed, and determining whether a channel between the beamformer and the beamformee has changed based on a correlation of most recent channel estimates. When the antenna configuration at the beamformee has not changed and the channel has not changed, then the beamformee can continue determining channel estimates based on the signals from the beamformer. In contrast, when at least one of the antenna configuration at the beamformee has changed and the channel has changed, then the beamformee can send an advance notice to the beamformer to trigger an update of the beamforming matrix.

In another embodiment in the beamformee, the method can include determining channel estimates based on signals from the beamformer, determining whether an antenna configuration at the beamformee has changed, and determining whether a channel between the beamformer and the beamformee has changed based on an orthogonality of an estimated channel matrix. When the antenna configuration at the beamformee has not changed and the channel has not changed, then the beamformee can continue determining channel estimates based on the signals from the beamformer. In contrast, when at least one of the antenna configuration at the beamformee has changed and the channel has changed, then the beamformee can send an advance notice to the beamformer to trigger an update of the beamforming matrix.

In yet another embodiment in the beamformee, the method can include determining channel estimates based on signals from the beamformer, determining whether an antenna configuration at the beamformee has changed, and determining whether a channel between the beamformer and the beamformee has changed based on a correlation of most recent channel estimates and/or an orthogonality of an estimated channel matrix. When the antenna configuration at the beamformee has not changed and the channel has not changed, then the beamformee can continue determining channel estimates based on the signals from the beamformer. In contrast, when at least one of the antenna configuration at the beamformee has changed and the environment has changed, then the beamformee can send an advance notice to the beamformer to trigger an update of the beamforming matrix.

A method for determining when a beamforming matrix is updated in a wireless communications system including a beamformer and a pseudo-beamformee is also described. In the beamformer, the method can include determining channel estimates based on predetermined signals from the pseudo-beamformee, determining whether an antenna configuration at the beamformer has changed, and determining whether a channel between the beamformer and the pseudo-beamformee has changed based on a correlation of most recent channel estimates. When the antenna configuration at the beamformer has not changed and the channel has not changed, then the beamformer can continue determining channel estimates based on the predetermined signals from the pseudo-beamformee. In contrast, when at least one of the antenna configuration at the beamformer has changed and the channel has changed, then the beamformer can trigger an update of the beamforming matrix.

One wireless device for performing beamformer functions can include a plurality of antennas, a beamforming unit coupled to the plurality of antennas, and a control circuit coupled to the beamforming unit. The control circuit can be configured to determine when to trigger a sounding packet. For example, the control circuit can be configured to perform the following steps: determining channel estimates based on predetermined signals from an other wireless device, determining whether an antenna configuration at the wireless device has changed, determining whether a channel between the wireless device and the other wireless device has changed based on a correlation of most recent channel estimates, and determining whether the wireless device has received an advance notice from the other wireless device. When the antenna configuration at the wireless device has not changed, the channel has not changed, and the wireless device has not received advance notice, then the wireless device can continue determining channel estimates based on the predetermined signals from the other wireless device. In contrast, when at least one of the antenna configuration at the wireless device has changed, the environment has changed, and the wireless device has received advance notice, then the wireless device can trigger an update of a beamforming matrix.

One wireless device for performing beamformee functions can include a plurality of antennas and a control circuit coupled to the plurality of antennas. The control circuit can be configured to determine when to trigger an advance notice. For example, the control circuit can be configured to perform the following steps: determining channel estimates based on signals from an other wireless device, determining whether an antenna configuration at the wireless device has changed, and determining whether a channel between the wireless device and the other wireless device has changed based on a correlation of most recent channel estimates. When the antenna configuration at the wireless device has not changed and the channel has not changed, then the wireless device can continue determining channel estimates based on the signals from the other wireless device. In contrast, when at least one of the antenna configuration at the wireless device has changed and the channel has changed, then the wireless device can send the advance notice to the other wireless device to trigger an update of a beamforming matrix.

Another wireless device for performing beamformee functions can include a plurality of antennas and a control circuit coupled to the plurality of antennas. The control circuit can be configured to determine when to trigger an advance notice. For example, the control circuit can be configured to perform the following steps: determining channel estimates based on signals from an other wireless device, determining whether an antenna configuration at the wireless device has changed, and determining whether a channel between the wireless device and the other wireless device has changed based on an orthogonality of an estimated channel matrix. When the antenna configuration at the wireless device has not changed and the channel has not changed, then the wireless device can continue determining channel estimates based on the signals from the other wireless device. In contrast, when at least one of the antenna configuration at the wireless device has changed and the channel has changed, then the wireless device can send the advance notice to the other wireless device to trigger an update of a beamforming matrix.

Yet another wireless device for performing beamformee functions can include a plurality of antennas and a control circuit coupled to the plurality of antennas. The control circuit can be configured to determine when to trigger an advance notice. For example, the control circuit can be configured to perform the following steps: determining channel estimates based on signals from an other wireless device, determining whether an antenna configuration at the wireless device has changed, and determining whether a channel between the wireless device and the other wireless device has changed based on a correlation of most recent channel estimates and/or an orthogonality of an estimated channel matrix. When the antenna configuration at the wireless device has not changed and the channel has not changed, then the wireless device can continue determining channel estimates based on the signals from the other wireless device. In contrast, when at least one of the antenna configuration at the wireless device has changed and the channel has changed, then the wireless device can send the advance notice to the other wireless device to trigger an update of a beamforming matrix.

In one embodiment, a wireless device for performing beamformer functions can include a plurality of antennas, a beamforming unit coupled to the plurality of antennas, and a control circuit coupled to the beamforming unit. The control circuit can be configured to determine when to trigger a sounding packet. For example, the control circuit can be configured to perform the following steps: determining channel estimates based on predetermined signals from a non-beamforming wireless device, determining whether an antenna configuration at the wireless device has changed, and determining whether a channel between the wireless device and the non-beamforming wireless device has changed based on a correlation of most recent channel estimates. When the antenna configuration at the wireless device has not changed and the channel has not changed, then the wireless device can continue determining channel estimates based on the predetermined signals from the non-beamforming wireless device. In contrast, when at least one of the antenna configuration at the wireless device has changed and the channel has changed, then the wireless device can trigger an update of a beamforming matrix.

BRIEF DESCRIPTION OF THE DRAWINGS

FIGS. 6A and 6B illustrate two sets of differential sequences of channel estimations, wherein polarities of these estimates can be used to determine correlation.

DETAILED DESCRIPTION OF THE DRAWINGS

The antenna configurations of a wireless communications system including a beamformer and a beamformee may be changed. In an improved technique for triggering a sounding packet, notification of an antenna re-configuration, either at the beamformer or the beamformee can be quickly used by the beamformer to trigger the sounding packet. This technique and others are described in further detail below.

Figure 1:
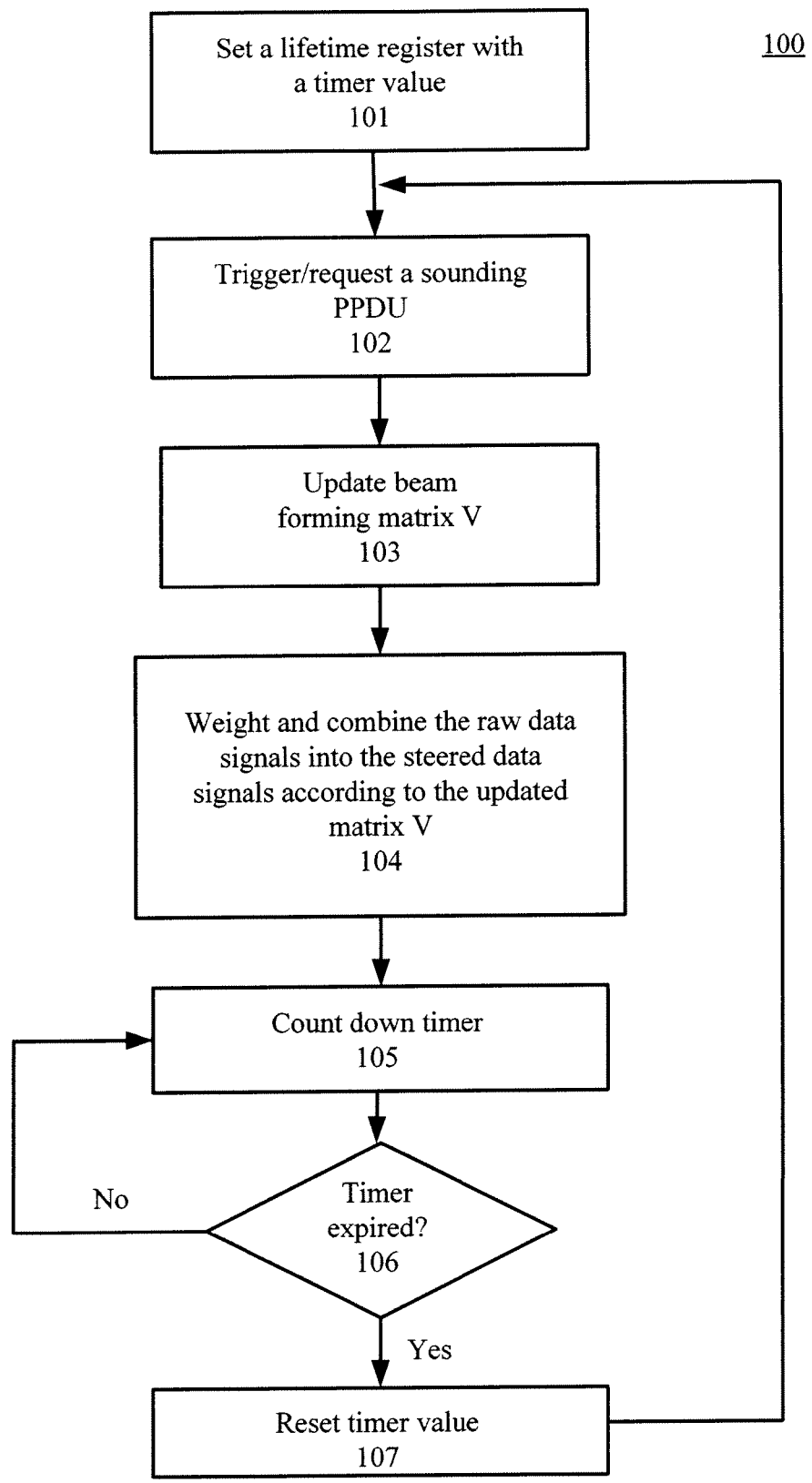
FIG. 1 illustrates an exemplary technique using a timer for determining how often the sounding packets are to be triggered.

FIG. 1 illustrates an exemplary technique 100 using a programmable timer for determining when to trigger sounding packets. Initially, a lifetime register can be programmed with a timer value in step 101. This timer value can determine the time interval between when sounding PPDUs are triggered. As used herein, a "PPDU" is a PLCP Protocol Data Unit, wherein PCLP refers to the Physical Layer Convergence Protocol. A sounding PPDU can be characterized as a sounding packet. Although sounding PPDUs are described herein, the techniques herein may also use other types of sounding packets.

For environments that are stable (e.g. indoors), the timer value can be set longer. Setting the timer value for a longer duration under these circumstances can be advantageous because the overhead associated with the transmissions of sounding PPDUs can be minimized. Conversely, for environments that are subject to rapid changes (e.g. mobile or outdoor), the timer value can be set shorter. Setting the timer value for a shorter duration under these circumstances is advantageous because performance degradation is minimized. Consequently, the Multiple-Input Multiple-Output (MIMO) system can be programmed to adapt to a wide range of applications.

Notably, technique 100 can be implemented in an explicit beamforming mode or an implicit beamforming mode. In an explicit beamforming mode, the transmitter (the "beamformer") is triggered to send the sounding PPDU to the receiver (the "beamformee") in step 102. In response to the sounding PPDU, the beamformee can generate information that can be used to update a beamforming matrix V in step 103.

This information can include channel state information (CSI), the beamforming matrix V, or a compressed beamforming matrix CV. In one embodiment, the beamformee can estimate the channel characteristics, and transmit this CSI to the beamformer. Using the CSI, the beamformer can then perform computations to determine the beamforming matrix V. In another embodiment, the beamformee can estimate the CSI, generate the beamforming matrix V itself, and then transmit the beamforming matrix V to the beamformer. In yet another embodiment, the beamformee can estimate the CSI, generate the beamforming matrix V, compress the beamforming matrix V, and then transmit the compressed matrix CV to the beamformer. Using any one of the CSI/V/CV, the beamformer can weight and combine the raw data signals into beamformed data signals in step 104.

In an implicit beamforming mode, the beamformer is triggered to request the sounding PPDU in step 102 (also called a training request TRQ herein). In response, the beamformee sends the sounding PPDU to the beamformer. Using this sounding PPDU, the beamformer can derive a channel matrix H, which can be used to update the beamforming matrix V in step 103.

During transmission of data packets based on the updated matrix V, a timer value is counted down in step 105 until it expires as determined by step 106. Once the timer expires, the timer value is reset in step 107, and the process returns to step 102. Notably, in technique 100, the timer value in step 107 can ensure that sounding PPDUs are triggered and beamforming matrices are efficiently updated depending on the operating environment. Specifically, the timer value can be reset/changed to adapt to an operating environment of that MIMO system.

Figure 2:
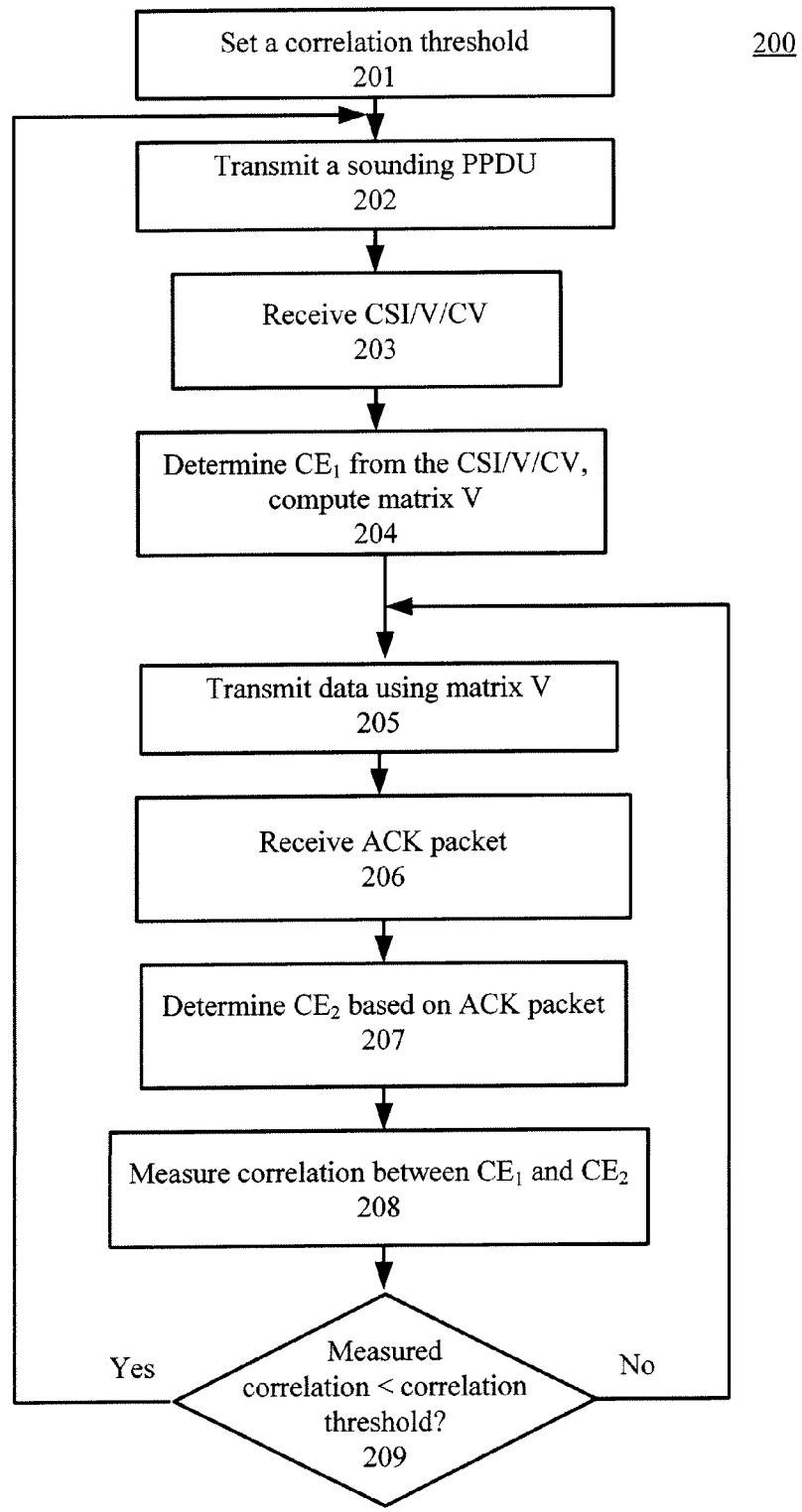
FIG. 2 illustrates an exemplary technique using correlations between channel estimation results of CSI/V/CV and ACK packets for determining when to trigger sounding packets.

FIG. 2 illustrates an exemplary technique 200, implemented in an explicit beamforming mode, for determining when to trigger sounding packets based on correlations between channel estimation results of CSI/V/CV and ACK packets. Initially, a correlation threshold in the beamformer is set in step 201. The correlation threshold can be set at a fixed value or can be programmably set so as to give an administrator control over the sensitivity.

In step 202, the beamformer transmits a sounding PPDU. The beamformee receives the PPDU packet and generates the CSI, V, or CV (CSI/V/CV) information. The beamformer receives the CSI/V/CV information in step 203. The beamformer determines and stores a channel estimation $CE_1$ based on the CSI/V/CV information in step 204. In step 205, the beamformer can generate a beamforming matrix V using the CSI/V/CV information and transmit data packets based on that beamforming matrix V. To acknowledge successful receipt of a data packet, the beamformee transmits an acknowledgment (ACK) packet to the beamformer, which is received in step 206.

In step 207, the beamformer can determine another channel estimate $CE_2$ based on the received ACK packet. In step 209, the beamformer can perform a correlation measurement between the stored $CE_1$ and the current $CE_2$, wherein the correlation indicates how closely $CE_2$ resembles $CE_1$. A high correlation, which indicates that $CE_2$ is similar to $CE_1$, can infer that the channel has not substantially changed between the receiving of the CSI/V/CV information and the ACK packet. Consequently, the current beamforming matrix V, although stale, can still be used. A low correlation, which indicates that $CE_2$ is relatively different from $CE_1$, can infer that the channel has significantly changed between the receiving of the CSI/V/CV information and the ACK packet. Consequently, the beamforming matrix V may no longer valid.

In one embodiment, step 209 determines whether the measured correlation is less than the correlation threshold (set in step 201). If the measured correlation is less than the correlation threshold, thereby indicating that a new sounding PPDU should be triggered to initiate updated CSI/V/CV information, then the process can return to step 202. On the other hand, if the measured correlation is not less than the correlation threshold (i.e. the measured correlation between $CE_1$ and $CE_2$ is greater than or equal to the correlation threshold), thereby indicating a new sounding PPDU is unnecessary, then the process returns to step 206. Thus, technique 200 can automatically adjust the intervals between when sounding PPDUs are triggered based on the correlation between the channel estimates of the CSI/V/CV information and the ACK packets. Notably, by deriving this correlation information from standard ACK packets, sounding PPDUs can be triggered with no additional overhead.

Note that technique 200 is not limited to performing a correlation for each ACK packet. Specifically, technique 200 can be adapted to perform correlations on every second, third, etc. ACK packet. Technique 200 can also perform correlations on ACK packets depending on prior history results. For example, if the correlation threshold is frequently being missed, then correlation measurements can be performed more routinely on received ACK packets (e.g. correlations performed for each ACK packet). In contrast, if the correlation measurements show that the correlation threshold is not being missed, then correlations may be performed less frequently (e.g. correlations performed for every fifth ACK packet). This ACK packet history (e.g. generated in step 209) can further enhance dynamically adapting to an operating environment.

In one embodiment, instead of correlating the channel estimates of CSI/V/CV information and ACK packets, the correlation can be performed using two different ACK packets. This embodiment can be applied to both an explicit beamforming system (described above) as well as an implicit beamforming system (described in further detail below).

Note that in an implicit beamforming system, the beamformee does not explicitly transmit channel information to the beamformer. Instead, the beamforming matrix V can be calculated or determined based on the principle that the forward channel (i.e. the channel from the beamformer to the beamformee) is reciprocal to the reverse channel (i.e. the channel from the beamformee to the beamformer). True reciprocity can be achieved when calibrations are performed to account for gain and/or phase differences between TX and RX chains of both beamformer and beamformee. More specifically, the beamformer can use received signals (e.g. the preambles) from the beamformee to calculate a channel matrix of the reverse channel $H_{Reverse}$. A matrix transpose is then applied to estimate a forward channel matrix $H_{Forward}$. The beamforming matrix V can be calculated based on the derived forward channel matrix $H_{Forward}$. Consequently, implicit beamforming eliminates the exchange overhead of transmitting CSI/V/CV information. However, implicit beamforming may use more computational resources than explicit beamforming.

Figure 3:
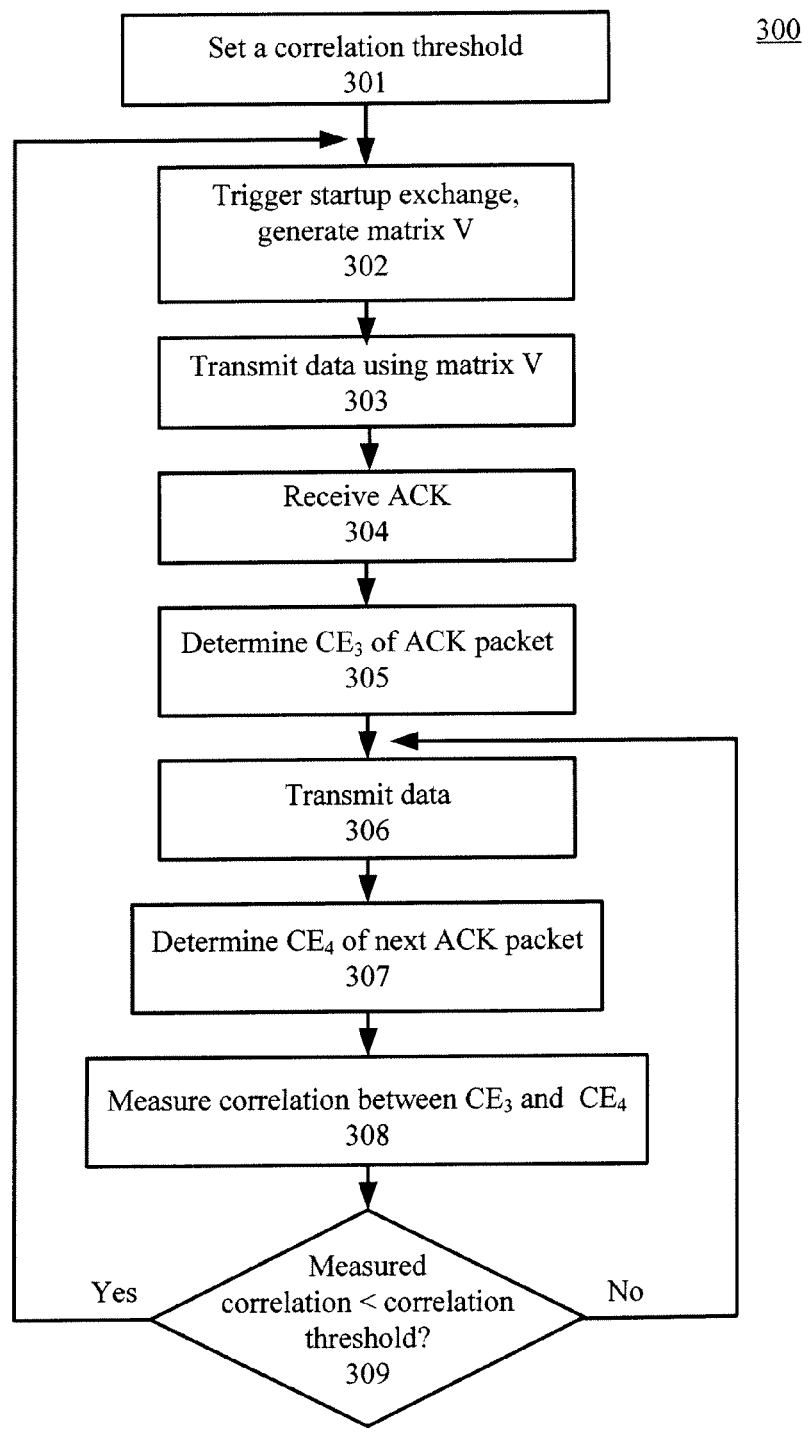
FIG. 3 illustrates an exemplary technique using correlations between channel estimations of ACK packets for determining when to trigger sounding packets.

FIG. 3 illustrates an exemplary technique 300 that can use correlations between channel estimations of ACK packets to determine when to trigger sounding packets. In step 301, a correlation threshold can be set. In step 302, a startup exchange can be triggered. This startup exchange, implemented in either an explicit or implicit beamforming mode (in one of the embodiments described above), can generate the beamforming matrix V. Using this beamforming matrix V, the beamformer can transmit its first data packet in step 303. The beamformee replies to this data packet by transmitting an ACK packet, which is received by the beamformer in step 304. The beamformer can determine a channel estimation $CE_3$ based on the first received ACK packet in step 305. The beamformer continues to transmit the next data packet in step 306. In reply, the beamformee transmits a reply ACK to the beamformer, which in turn can calculate the channel estimation $CE_4$ of this second received ACK in step 307.

In step 308, the correlation between $CE_3$ and $CE_4$ can be measured. This correlation measurement can indicate changes in the channel between the times when the first ACK packet and a succeeding (second, third, etc.) ACK packet were sent. A high correlation means that the channel has remained relatively stable. Conversely, a low correlation means that the channel has undergone a significant change.

Step 309 can determine whether the measured correlation is less than a predetermined correlation threshold. If the measured correlation is not less than the correlation threshold, then the process returns to step 306 and the beamformer continues to transmit data packets using the most recently calculated beamforming matrix V and determines the correlation between the old $CE_3$ and a new $CE_4$. On the other hand, if the measured correlation is less than the correlation threshold, then the process returns to step 302 and the beamformer triggers a new startup exchange, discards the stale matrix V, and generates an updated beamforming matrix V based on the PPDU/TRQ used in the new startup exchange.

Figure 4:
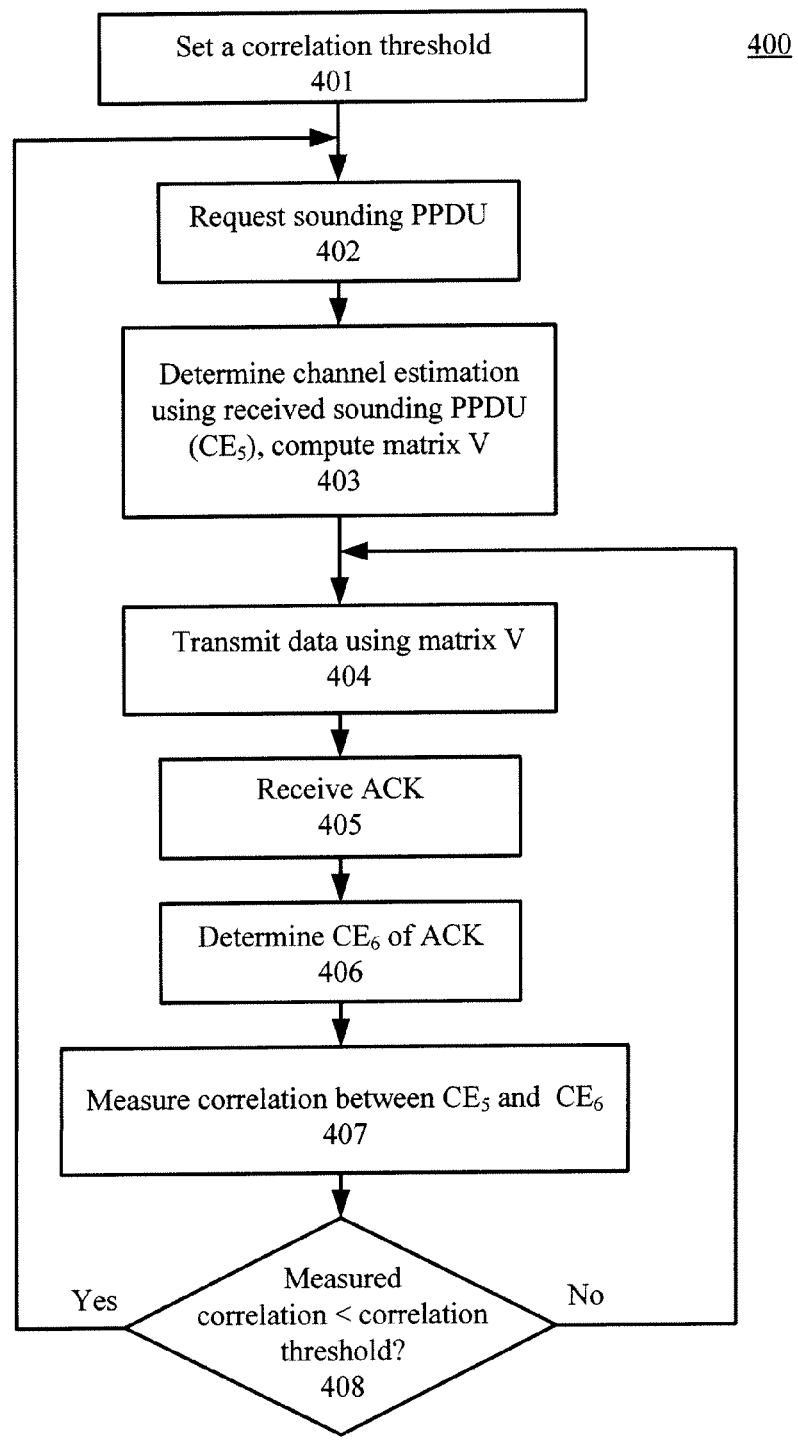
FIG. 4 illustrates an exemplary technique using correlations between channel estimations of sounding PPDU and channel estimations of ACK packets for determining when to trigger sounding packets.

FIG. 4 illustrates an exemplary technique 400, implementable in an implicit beamforming mode, that uses correlations between channel estimations of an uplink sounding PPDU and an ACK packet to determine when to trigger sounding packets. In step 401, a correlation threshold can be set. In step 402, the beamformer can request a sounding PPDU from the beamformee (also called a training request (TRQ) herein). In step 403, the beamformer can determine a channel estimation $CE_5$ based on the sounding PPDU. In step 404, the beamformer can transmit data signals according to the beamforming matrix V that was derived from the sounding PPDU. In response to the data signals, the beamformer receives an ACK packet from the beamformee in step 405. In step 406, the beamformer can determine a channel estimation $CE_6$ based on the received ACK packet.

In step 407, the beamformer can measure a correlation between $CE_5$ and $CE_6$. In step 409, this measured correlation can be compared to the correlation threshold (set in step 401). If the measured correlation is less than the correlation threshold, thereby indicating that the channel has undergone a significant change, then the current beamforming matrix V is deemed stale and a new, updated beamforming matrix V can be calculated when the process returns to step 402. On the other hand, if the measured correlation is greater than or equal to the correlation threshold, thereby indicating that the channel is substantially the same, then the current beamforming matrix V is deemed satisfactory and the process can return to step 405.

Note that, in reference to the techniques described in FIGS. 2, 3, and 4, at least two channel estimations are processed to determine two corresponding channel characteristics. This process can include filtering, transforming, or mapping procedure(s) to improve the correlation accuracy.

Figure 5:
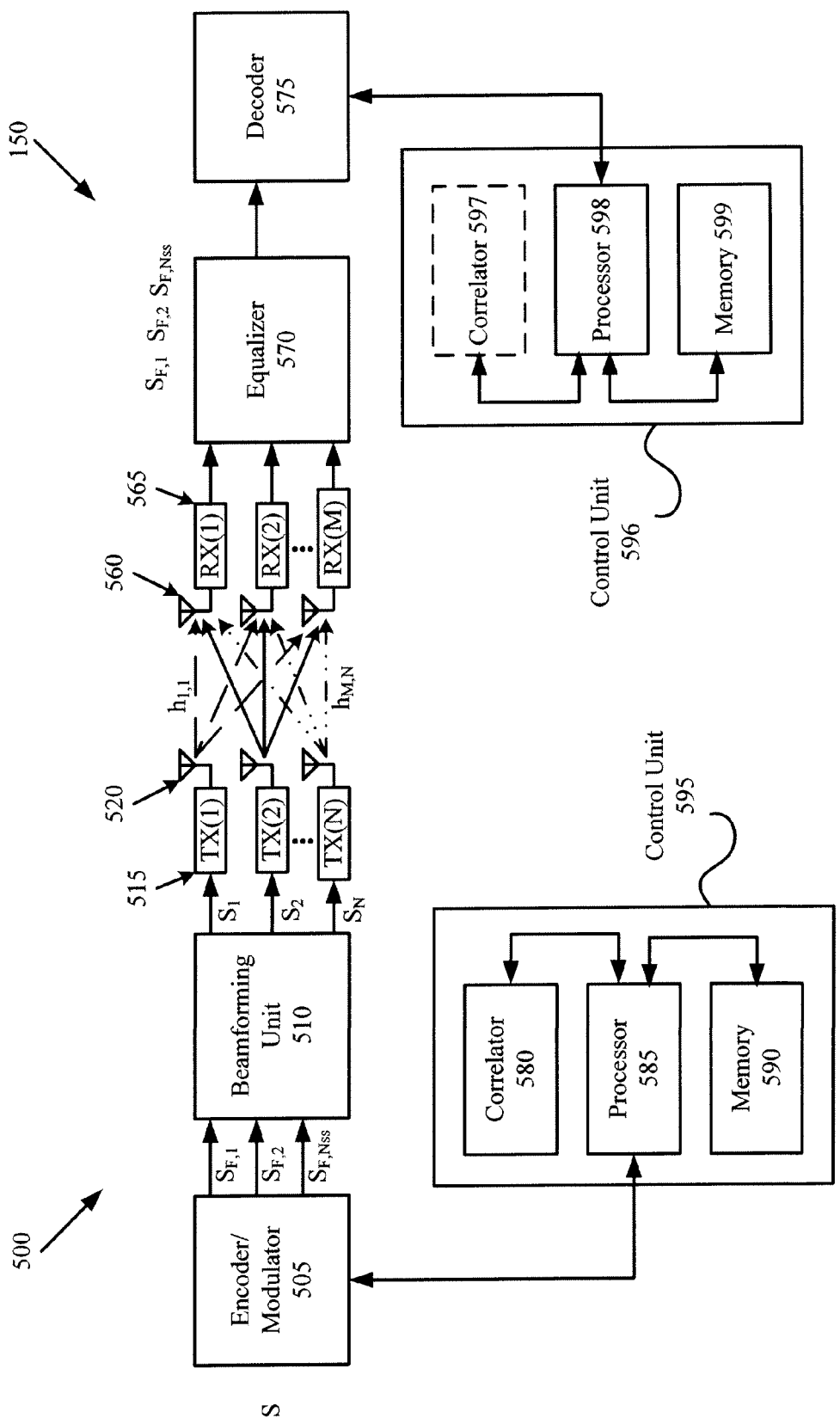
FIG. 5 illustrates an exemplary wireless communication device for implementing the embodiments described in FIGS. 1-4.

FIG. 5 illustrates an exemplary wireless communication system that can implement the techniques described in FIGS. 1-4. This system can include two multiple-input, multiple-output (MIMO) devices 500 and 550, wherein device 500 has N antennas in an antenna array 520 and device 550 has M antennas in an antenna array 560. In one embodiment, M is equal to N.

In general, a transmitting device can be referred to as a beamformer, and a receiving device can be referred to as a beamformee. Notably, devices 500 and 550 may perform either or both roles, and thus may be referred to as a transmitter or beamformer when it is transmitting, and as a receiver or beamformee when it is receiving. Thus, for example, each of devices 500 and 550 includes a transmit chain per antenna and a receive chain per antenna. For simplicity, device 500 is described as being the transmitter/beamformer having N transmit chains and device 550 is described as being the receiver/beamformee having M receive chains.

Note that in FIG. 5, each block may perform one or more functions. In an actual implementation, the function(s) performed by that block may be performed by a single component or by multiple components, and/or may be performed using hardware, software, or using a combination of hardware and software. Also, devices 500 and 550 may include components other than those shown.

In device 500, an encoder/modulator block 505 and a beamforming unit 510 are coupled upstream of the N transmit chains. The encoder and modulator block 505 encodes and modulates a signal S from a processor 585. In one embodiment, a sub-channel division technique such as orthogonal frequency division modulation (OFDM) can be utilized to partition the signal S into $N_{SS}$ spatial signals for F frequency bins (sub-carriers). Beamforming unit 510 can weight and optionally combine each spatial signal at each sub-carrier $S_{F,1}, S_{F,2}, \ldots, S_{F,Nss}$ to generate N different signals $S_1, S_2, \ldots, S_N$, i.e. one signal for each transmit chain. Notably, beamforming unit 510 can transform each of the signal $S_{F,1}, S_{F,2} \ldots, S_{F,Nss}$ to account for the specific channel characteristics of each sub-carrier associated with each of the antennas in antenna array 520.

Transmit chains 515 can perform other operations on the steered and weighted signals. For example, the signals output from beamformer 510 can be converted into digital outputs that are in turn converted into analog baseband outputs, which are then modulated into wireless (e.g. radio frequency (RF)) signals that are up-converted from the baseband frequency and transmitted via antenna array 520. Signals transmitted from antenna array 520 pass through individual paths to antenna array 560 of device 550. These paths are assumed to be flat fading channels (i.e. all frequency components of a signal experience the same magnitude of fading) for each frequency bin. Accordingly, the characteristics of each path can be represented using complex numbers that quantify, for example, the change in amplitude and phase of a signal along the respective paths between the transmitter and receiver.

In FIG. 5, $h_{M,N}$ represents the channel characteristics of a path from the Nth transmit antenna (TX(N)) to the Mth receive antenna (RX(M)). Note that, if device 550 is transmitting to device 500, both using the same antennas, then the channel characteristics can also be represented as $h_{M,N}$. Similarly, the characteristics of the forward channel along a path between, for example, antenna TX(2) of device 500 and antenna RX(1) of device 550 would be identified as $h_{1,2}$, whereas characteristics of the reverse channel along the same path from antenna RX(1) of device 550 to antenna RX(2) of device 500 would also be identified as $h_{1,2}$. In one embodiment, channel reciprocity is used, wherein the forward and reverse channels can have the same channel characteristics. In another embodiment, calibration can be used to validate a relationship between the forward and reverse channels, e.g. $\tilde{H}_{A,B} = \alpha \cdot \tilde{H}_{B,A}^T$, wherein "A" is a first device, "B" is a second device, "H" represents the baseband-to-baseband equivalent channels from device A to device B, and "α" is a set of values that compensates for the imbalance between the transmit and receive chains. This calibration is described in greater detail in U.S. patent application Ser. No. 12/367,119, filed by Atheros Communications, Inc. on Feb. 6, 2009, and Ser. No. 12/334,799, filed by Atheros Communications, Inc. on Dec. 15, 2008, both of which are incorporated by reference herein.

The transmitted signals from device 500 can be received at device 550 via its antenna array 560. In device 550, a signal equalizer 570 and a decoder 575 are coupled downstream of the M receive chains 565. Receive chains 565 can perform operations such as filtering, frequency down-conversion to the baseband frequency, and analog-to-digital conversion. Equalizer 570 detects the signals from receive chains 565 on a frequency bin basis, and decoder 575 decodes the equalizer output. The resulting decoded signal can be sent to a processor 598 for processing. The user data is then displayed to the user.

In FIG. 5, a control unit 595 includes a correlator 580, a processor 585, and a memory 590. In one embodiment, memory 590 stores, among other programs and data, the software used to implement the one or more of the processes described above in determining when sounding packets are to be triggered for transmission or when sounding packets are to be requested for reception. Memory 590 (or a different memory) can be used to retain the correlation threshold value.

Processor 585, coupled to memory 590, executes the software that determines when sounding packets are to be triggered. For example, in reference to technique 100 (FIG. 1), processor 585 can determine whether a programmable timing value has elapsed. Every time the timing value elapses, a new sounding packet is triggered for transmission and the timing value resets. Processor 585 can include a microprocessor, digital signal processor, network chip, specialized ASIC chip, or any other such device that can read and execute programming instructions stored in memory 590.

Correlator 580, which communicates with processor 585, can be used to perform the correlations between the corresponding pair of channel estimations according to techniques 200, 300, and 400 (FIGS. 2-4). In one embodiment, correlator 580 can further process the channel estimations to get a filtered or a transformed estimation before performing the correlations. Correlator 580 can also be used to perform correlations other than those involved with the triggering of sounding packets. In one embodiment, the correlations can be calculated directly (e.g. real $\{H_{old}*\text{conj}(H_{new})\}$), which can be computationally expensive. Alternatively, the correlations can be performed by comparing the frequency response profiles or bin weighting values. Bin weighting and frequency bins are described in detail in U.S. Pat. No. 7,385,914, entitled "Apparatus and Method of Multiple Antenna Transmitter Beamforming of High Data Rate Wideband Packetized Wireless Communication Signals", filed Oct. 8, 2003, and also U.S. Pat. No. 7,366,089, entitled "Apparatus and Method of Multiple Antenna Receiver Combining of High Data Rate Wideband Packetized Wireless Communication Signals", filed Oct. 8, 2003, both of which are incorporated by reference in their entirety herein.

In another embodiment, the correlation can be accomplished by defining a simple function that can identify the similarity of two channel estimations (CEs). For example, a process can be implemented to record the polarity of the gain (or bin weighting) difference of adjacent subcarriers for each channel estimation. The two polarity sequences are then correlated to obtain an approximate channel correlation. An example of a correlation that identifies the similarity of two channel estimations by examining the polarities is shown in FIGS. 6A and 6B. In FIGS. 6A and 6B, the channel estimations of adjacent subcarriers are depicted as waveforms 601 and 602. The polarities (e.g. slopes) are represented by the + and − symbols. A rising slope corresponds to a +, whereas a negative slope corresponds to a −. In this particular example, the polarity sequence for function 601 is "−, −, −, −, −, −, −, +, +, +, +, +, +, +, +, +, +, +, +, −, −, −, −, −, −, −, −, +, +, +, +, +, +, −"; and the polarity sequence for function 602 is "−, −, −, −, −, −, +, +, +, +, +, −, −, −, −, −, −, −, +, +, +, +, +, +, +, +, +, +." A correlation is performed on these two sequences and compared against the correlation threshold to determine whether a sounding packet is to be triggered. Basically, the measured correlation is obtained by comparing two differential sequences, each corresponding to one channel characteristic along the frequency bins.

In accordance with another aspect of an improved beamforming system, if the beamformer/beamformee is equipped with more antennas than actually used, the number of needed antennas can be selected (randomly or purposely) to maximize diversity gain. Note that to fully benefit from beamforming, an applied beamforming matrix V should be matched to an actual channel response. Because any change in the antenna selection would change the channel response, the beamforming matrix V should be updated to reflect the change.

Thus, for example, referring to FIG. 5, the number of transmitting antennas 530 could actually be greater than N and the number of receiving antennas 565 could actually be greater than M. As a result, two processing loops must be performed: one loop for selecting the appropriate antennas for the N transmit chains and M receive chains and another loop for the beamforming update. Note that the number of transmit/receive chains must be equal to or greater than 2 for beamforming to occur. Notably, the process of selecting the antennas, i.e. antenna re-configuration at either the beamformer or the beamformee is significantly slower than the process of beamforming update.

In IEEE 802.11n, only a beamformer has the authority to decide when to trigger a sounding packet (explicit mode or implicit mode) to update the beamforming matrix V. However, waiting for an antenna re-configuration to eventually be reflected in the channel estimate (wherein the selection process itself is slow) can result in yet further undesirable delay. Therefore, in accordance with one aspect of an improved triggering of sounding packets, information regarding an antenna re-configuration (either in the beamformer or the beamformee) can automatically trigger a sounding packet, thereby resulting in more quickly updating the beamforming matrix V. In one embodiment, the beamformee can perform its own computations regarding the channel and send an advance notice to the beamformer when the computations indicate a changing channel and/or the antennas at the beamformee are re-configured.

Figure 7:
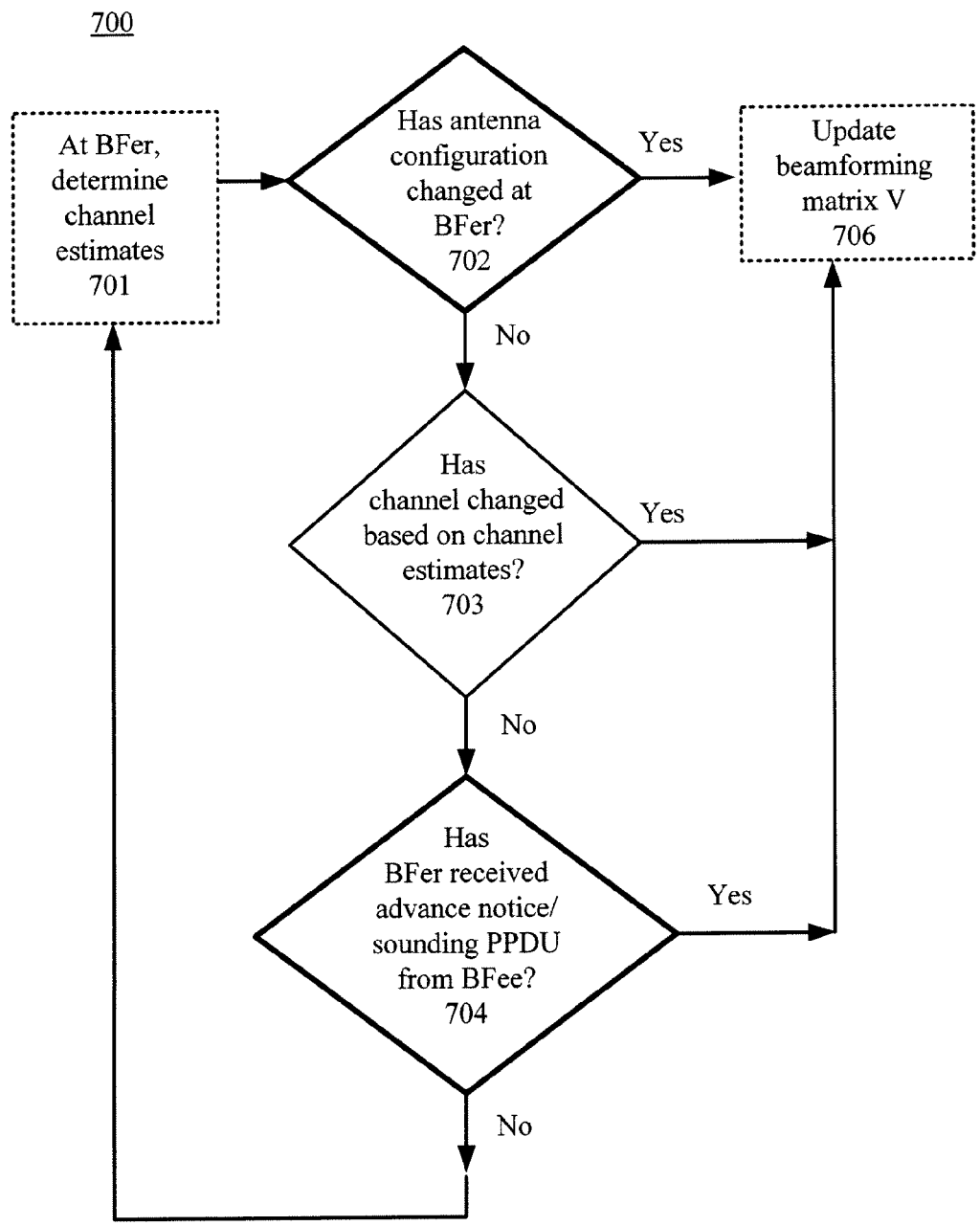
FIG. 7 illustrates an exemplary technique that can be used in the beamformer to expand upon the correlation measurement/threshold compare steps described in reference to FIGS. 2-4 based on additional factors.

FIG. 7 illustrates an exemplary technique 700 that can be used in the beamformer to expand upon the correlation measurement/threshold compare steps described in reference to FIGS. 2-4 (e.g. steps 208/209 (FIG. 2), 308/309 (FIG. 3), and 407/408 (FIG. 4)) based on additional factors. Note that steps 701 and 706, which are shown for context only in FIG. 7, are described in further detail with respect to FIGS. 2-4.

In step 701, the beamformer can determine channel estimates based on signals from the beamformee. Step 702 determines if an antenna configuration at the beamformer has changed. For example, a beamformer can be configured to automatically send/request a sounding PPDU when its antenna configuration changes. Step 703 can determine whether an environment has changed based on the channel estimates measured at the beamformer. Step 703 can include the steps of FIG. 2, 3, or 4 that determine a correlation based on two channel estimates. Step 704 can determine whether the beamformer has received advance notice of a needed matrix change or a sounding PPDU from the beamformee. The advance notice and the sounding PPDU from the beamformee is described in further detail with respect to FIG. 8.

Note that steps 702, 703, and 704 can be performed in any order. If the answer to any of steps 702, 703, or 704 is "yes", then the beamformer can trigger an update sequence to the beamforming matrix V in step 706 (explicit or implicit mode). In contrast, if all of the answers to steps 702, 703, and 704 are "no", then the beamformer continues to determine channel estimates in step 701.

To allow step 704, the beamformee can advantageously include an additional software protocol that allows the beamformee to convey the advance notice of a needed change to the beamforming matrix V via the data payload of a packet transmitted to the beamformer. In this manner, the beamformee can advantageously alert the beamformer to this change before the beamformer would otherwise detect the change based on the correlation of the channel estimates.

Figure 8:
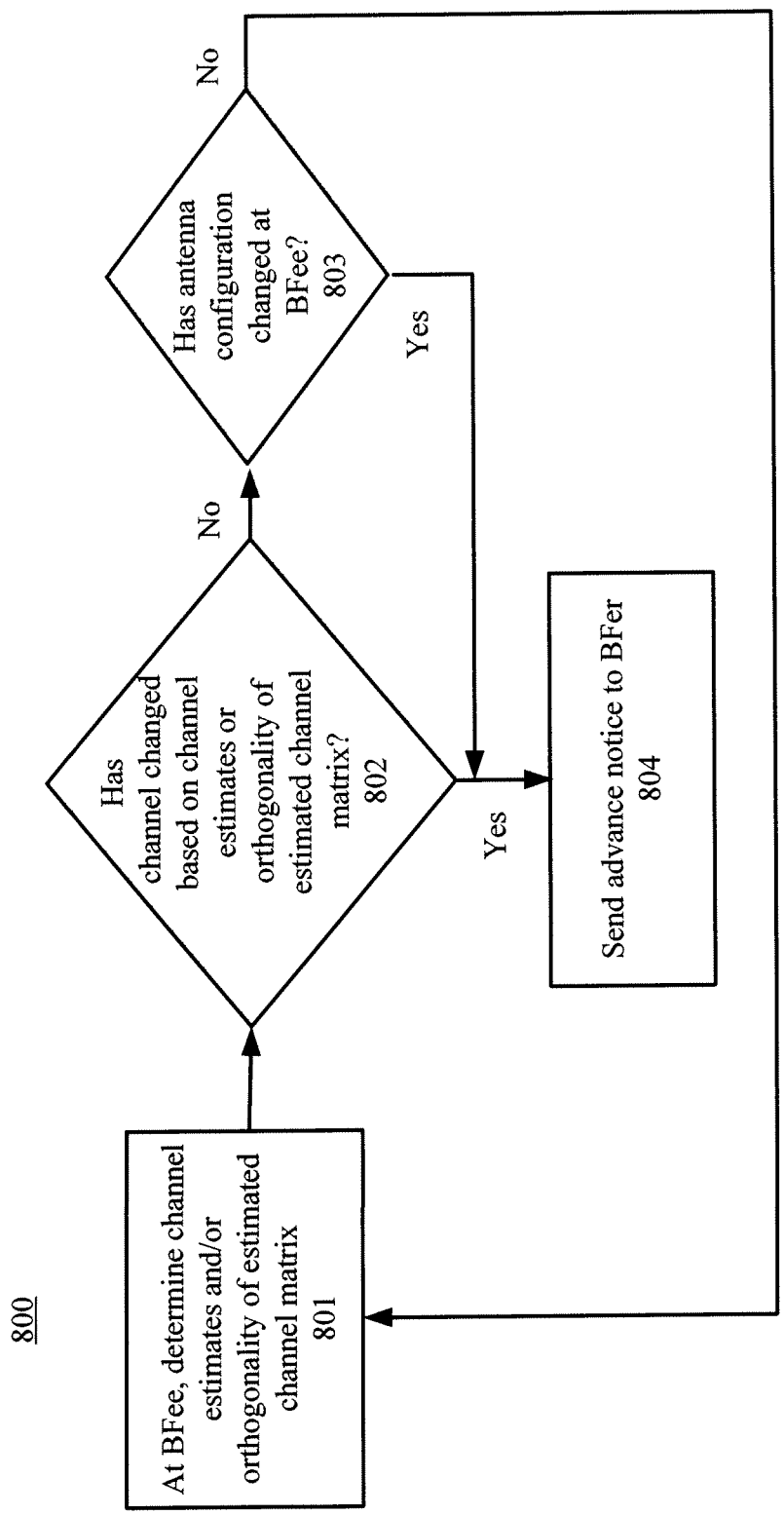
FIG. 8 illustrates an exemplary technique that can be used by the beamformee to generate an advance notice.

For example, FIG. 8 illustrates an exemplary technique 800 that can be used by the beamformee to generate such an advance notice. In step 801, the beamformee can monitor the estimated channel response of one or more received packets, i.e. the channel estimates of those packets, to determine if they are substantially correlated to a channel estimate of a first received, beamformed packet. Note that this correlation can be any metric that can quantify the similarity between two channel responses ((at least above a predetermined threshold, similar to the correlation threshold described in the beamformer). If the correlation is lower than a threshold value, thereby indicating that the channel has changed as determined in step 802, then the beamformee can inform the beamformer using the advanced notice (via the additional software protocol) in step 804. The advanced notice can advantageously trigger the beamformer to either transmit a sounding packet (explicit mode) or a training request (TRQ) (implicit mode) to the beamformee, thereby initiating an update of the beamforming matrix V (as described in detail in reference to any of FIGS. 2-4).

Note that in one embodiment, in addition to or instead of channel monitoring, the beamformee can monitor the orthogonality of the estimated channel matrix in step 801. Specifically, if the beamformer has at least two spatial streams as well as at least two transmit antennas ($N_{ss} \geq 2$, $N_{tx} \geq N_{ss}$), and the beamformee uses at least two receive antennas ($N_{rx} \geq 2$) to receive the beamformed packet, then the beamformee can monitor the orthogonality of the estimated channel matrix.

Ideally, the effective channel matrix with transmit beamforming should include orthogonal columns. For the first beamformed packet, a metric to individually quantify the orthogonality of each subcarrier's estimated channel matrix can be used. In one embodiment, an average of a set (e.g. at least two) of these matrices can provide a threshold $Th_{orth}$. At that point, for subsequent beamformed packets, the measured orthogonality metrics can be compared to this threshold to determine whether the channel is significantly changed, as measured in step 802. If the orthogonality metrics are lower than the threshold, thereby indicating that the channel has changed as determined in step 802, then the beamformee can inform the beamformer using the advanced notice (via the additional software protocol) in step 804.

Note that one exemplary orthogonality metric is the ratio of the power of all diagonal elements to the power of all off-diagonal elements in $H^H_{eff} \cdot H_{eff}$. Equations (1) and (2) below show the ideal case.

$$H_{eff} = H \cdot V = UDV^H V = UD \text{ (composed of orthogonal columns)} \quad \text{Eq. (1)}$$

$$H^H_{eff} \cdot H_{eff} = D^2 \cdot I \text{ (off-diagonal terms are all zeros)} \quad \text{Eq. (2)}$$

where $H_{eff}$ is the equivalent channel response observed at the beamformee side when beamforming. Variables U, D, and V are obtained from the singular value decomposition of H, wherein D is a diagonal matrix with positive entries while U and V are unitary matrices.

The beamformee can also be configured to automatically send an advance notice when its antenna configuration changes, which is determined in step 803. If the antenna configuration has changed at the beamformee, then the beamformee can send the advance notice to the beamformer in step 804. If (1) the channel has not changed, as determined in step 802, (2) the antenna configuration at the beamformee has not changed, as determined in step 803, or (3) the beamformee has sent an advance notice to the beamformer, then the beamformee can return to monitoring in step 801. Note that steps 802 and 803 can be performed in any order. Note further that steps 801-804 are in addition to the steps performed by the beamformee with respect to embodiments described in FIGS. 2-4.

In one embodiment, the beamformee may automatically send a sounding PPDU to the beamformer in step 804 (see step 704, FIG. 7). Note that in this case, the beamformer does not have to send a training request TRQ to the beamformee (i.e. as performed in the implicit beamforming mode). Once the beamformer receives the sounding PPDU, it may respond by immediately updating the beamforming matrix V.

Notably, in some embodiments, the beamformee may not support the above-described explicit beamforming matrix feedback or uplink sounding (e.g. the CSI/V/CV information (explicit mode) or the sounding PPDU (implicit mode)). In other words, the "pseudo-beamformee" is a legacy device, which actually has no beamforming capabilities. In other embodiments, the beamformer may want to estimate the uplink channel directly from an ACK/data packet instead of from the uplink sounding packet. In either case, to adopt the beamformer in either of these embodiments, the beamformer can be configured to utilize the long training field (LTF) symbols in any uplink ACK/data packets from the pseudo-beamformee to estimate the uplink channel response of the required dimension (assuming calibration is done).

Figure 9:
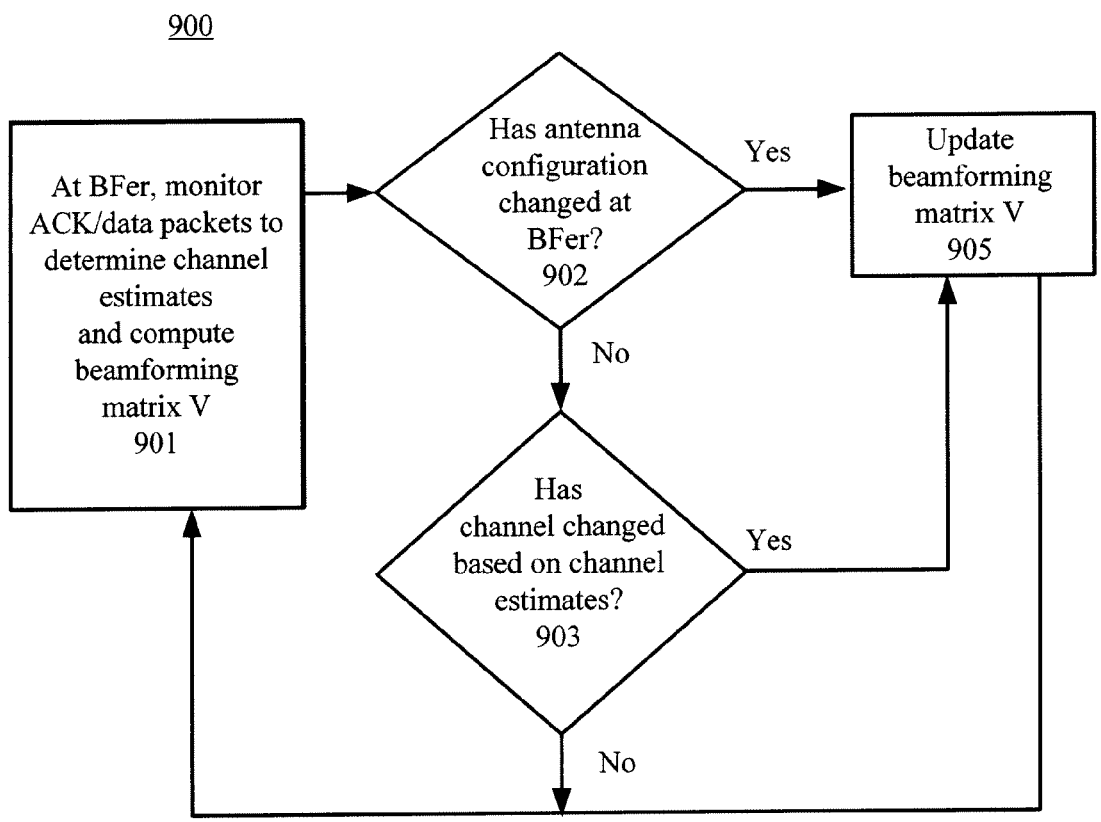
FIG. 9 illustrates an exemplary beamformer technique when associating with a pseudo-beamformee.

FIG. 9 illustrates an exemplary beamformer technique 900 when associating with a pseudo-beamformee. In step 901, the beamformer can monitor the ACK and/or data packets from the pseudo-beamformee to determine channel estimates and compute a beamforming matrix V using those channel estimates. Step 902 can determine if an antenna configuration at the beamformer has changed. Step 903 can determine whether an environment has changed based on the channel estimates measured at the beamformer. Note that steps 902 and 903 can be performed in any order. If either the antenna configuration at the beamformer has changed (step 902) or the environment has changed (step 903), then the beamformer can update the beamforming matrix V in step 905 (in either case using the most recent channel estimates determined in step 901). For example, a significant difference between the two most recent channel estimates can trigger a re-computation of the beamforming matrix V using the most recent channel estimates. If the antenna configuration at the beamformer has not changed (step 902), the environment has not changed (step 903), or the beamforming matrix V has just been updated (step 905), then the beamformer can return to step 901 to monitor the ACK/data packets.

Note that the steps performed in the beamformer described in reference to FIGS. 7 and 9 can be done in control unit 595, whereas the steps performed in the beamformee described in reference to FIG. 8 can be done a control unit 596. In one embodiment, control unit 596 can include a correlator 597, a processor 598, and a memory 599 that perform substantially the same functions described for correlator 580, processor 585, and memory 590, with the exception of generating the sounding packet. That is, control unit 596 is configured, at least in part, to generate the advance notice, not the sounding packet.

Further note that to minimize triggering sounding packets, antenna re-configuration should be performed judiciously during normal operation. Additionally, neither the beamformer nor the beamformee should change their antenna configuration during any sounding procedure described in reference to FIGS. 2-4 and 7-8.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent.

For example, embodiments described herein are not limited to the family of 802.11 standards, nor is it limited to sounding PPDUs. Embodiments can be applied to any wireless protocol, standard, or format that transmits packetized or non-packetized information over-the-air that is used to directly or indirectly determine the channel. Accordingly, it is intended that the scope of the invention be defined by the following Claims and their equivalents.

The invention claimed is:

1. A method for determining when a beamforming matrix is updated in a wireless communications system, the wireless communications system including a beamformer and a beamformee, the method comprising:
   in the beamformer,
      determining channel estimates based on predetermined signals from the beamformee, the predetermined signals including channel state information, a beamforming matrix, or a compressed beamforming matrix;
      determining whether an antenna configuration at the beamformer has changed;
      determining whether a channel between the beamformer and the beamformee has changed based on a correlation of a stored channel estimate and a current channel estimate; and
      determining whether the beamformer has received an advance notice from the beamformee,
      wherein when the antenna configuration at the beamformer has not changed, the channel has not changed as determined by the correlation not being less than a correlation threshold, and the beamformer has not received advance notice, then the beamformer continues determining channel estimates based on the predetermined signals from the beamformee, and
      wherein when at least one of the antenna configuration at the beamformer has changed, the channel has changed as determined by the correlation being less than the correlation threshold, and the beamformer has received advance notice, then the beamformer triggers an update of the beamforming matrix.

2. The method of claim 1, wherein the advance notice is triggered based on an antenna configuration at the beamformee changing.

3. The method of claim 1, wherein the advance notice is triggered based on the beamformee detecting a changing channel.

4. A method for determining when a beamforming matrix is updated in a wireless communications system, the wireless communications system including a beamformer and a beamformee, the method comprising:
   in the beamformee,
      determining channel estimates based on signals from the beamformer, the channel estimates including channel state information, a beamforming matrix, or a compressed beamforming matrix;
      determining whether an antenna configuration at the beamformee has changed; and
      determining whether a channel between the beamformer and the beamformee has changed based on a correlation between a stored channel estimate and a current channel estimate,
      wherein when the antenna configuration at the beamformee has not changed and the channel has not changed as determined by the correlation not being less than a correlation threshold, then the beamformee continues determining channel estimates based on the signals from the beamformer, and
      wherein when at least one of the antenna configuration at the beamformee has changed and the channel has changed as determined by the correlation being less than the correlation threshold, then the beamformee sends an advance notice to the beamformer to trigger an update of the beamforming matrix.

5. A method for determining when a beamforming matrix is updated in a wireless communications system, the wireless communications system including a beamformer and a beamformee, the method comprising:
   in the beamformee,
      determining channel estimates based on signals from the beamformer, the channel estimates including channel state information, a beamforming matrix, or a compressed beamforming matrix;
      determining whether an antenna configuration at the beamformee has changed; and
      determining whether a channel between the beamformer and the beamformee has changed based on an orthogonality of an estimated channel matrix,
      wherein when the antenna configuration at the beamformee has not changed and the channel has not changed as determined by the orthogonality not being less than an orthogonality threshold, then the beamformee continues determining channel estimates based on the signals from the beamformer, and
      wherein when at least one of the antenna configuration at the beamformee has changed and the channel has changed as determined by the orthogonality being less than the orthogonality threshold, then the beamformee sends an advance notice to the beamformer to trigger an update of the beamforming matrix.

6. A method for determining when a beamforming matrix is updated in a wireless communications system, the wireless communications system including a beamformer and a beamformee, the method comprising:
   in the beamformee,
      determining channel estimates based on signals from the beamformer, the channel estimates including channel state information, a beamforming matrix, or a compressed beamforming matrix;
      determining whether an antenna configuration at the beamformee has changed; and
      determining whether a channel between the beamformer and the beamformee has changed based on at least one of a correlation between a stored channel estimate and a current channel estimate, and an orthogonality of an estimated channel matrix,
      wherein when the antenna configuration at the beamformee has not changed and the channel has not changed as determined by at least one of the correlation not being less than a correlation threshold and the orthogonality not being less than an orthogonality threshold, then the beamformee continues determining channel estimates based on the signals from the beamformer, and
      wherein when at least one of the antenna configuration at the beamformee has changed and the channel has changed as determined by at least one of the correlation being less than the correlation threshold and the orthogonality being less than the orthogonality threshold, then the beamformee sends an advance notice to the beamformer to trigger an update of the beamforming matrix.

7. A method for determining when a beamforming matrix is updated in a wireless communications system, the wireless communications system including a beamformer and a pseudo-beamformee, the method comprising:
   in the beamformer,
      determining channel estimates based on predetermined signals from the pseudo-beamformee, the predetermined signals including channel state information, a beamforming matrix, or a compressed beamforming matrix;

determining whether an antenna configuration at the beamformer has changed; and determining whether a channel between the beamformer and the pseudo-beamformee has changed based on a correlation a stored channel estimate and a current channel estimate, wherein when the antenna configuration at the beamformer has not changed and the channel has not changed as determined by the correlation not being less than a correlation threshold, then the beamformer continues determining channel estimates based on the predetermined signals from the pseudo-beamformee, and wherein when at least one of the antenna configuration at the beamformer has changed and the channel has changed as determined by the correlation being less than the correlation threshold, then the beamformer triggers an update of the beamforming matrix.

8. A wireless device for performing beamformer functions, the wireless device comprising:

a plurality of antennas;

a beamforming unit coupled to the plurality of antennas; and a control circuit coupled to the beamforming unit, the control circuit configured to determine when to trigger an update of a beamforming matrix, the control circuit configured to perform steps including:

determining channel estimates based on predetermined signals from an other wireless device, the predetermined signals including channel state information, a beamforming matrix, or a compressed beamforming matrix;

determining whether an antenna configuration at the wireless device has changed;

determining whether a channel between the wireless device and the other wireless device has changed based on a correlation of a stored channel estimate and a current channel estimate; and determining whether the wireless device has received an advance notice from the other wireless device, wherein when the antenna configuration at the wireless device has not changed, the channel has not changed as determined by the correlation not being less than a correlation threshold, and the wireless device has not received advance notice, then the wireless device continues determining channel estimates based on the predetermined signals from the other wireless device, and wherein when at least one of the antenna configuration at the wireless device has changed, the channel has changed as determined by the correlation being less than the correlation threshold, and the wireless device has received advance notice, then the wireless device triggers an update of the beamforming matrix.

9. A wireless device for performing beamformee functions, the wireless device comprising:

a plurality of antennas; and a control circuit coupled to the plurality of antennas, the control circuit configured to determine when to trigger an advance notice, the control circuit configured to perform steps including:

determining channel estimates based on signals from another wireless device, the channel estimates including channel state information, a beamforming matrix, or a compressed beamforming matrix;

determining whether an antenna configuration at the wireless device has changed; and determining whether a channel between the wireless device and the other wireless device has changed based on a correlation between a stored channel estimate and a current channel estimate, wherein when the antenna configuration at the wireless device has not changed and the channel has not changed as determined by the correlation not being less than a correlation threshold, then the wireless device continues determining channel estimates based on the signals from the other wireless device, and wherein when at least one of the antenna configuration at the wireless device has changed and the channel has changed as determined by the correlation being less than the correlation threshold, then the wireless device sends the advance notice to the other wireless device to trigger an update of a beamforming matrix.

10. A wireless device for performing beamformee functions, the wireless device comprising:

a plurality of antennas; and a control circuit coupled to the plurality of antennas, the control circuit configured to determine when to trigger an advance notice, the control circuit configured to perform steps including:

determining channel estimates based on signals from another wireless device, the channel estimates including channel state information, a beamforming matrix, or a compressed beamforming matrix;

determining whether an antenna configuration at the wireless device has changed; and determining whether a channel between the wireless device and the other wireless device has changed based on an orthogonality of an estimated channel matrix, wherein when the antenna configuration at the wireless device has not changed and the channel has not changed as determined by the orthogonality not being less than an orthogonality threshold, then the wireless device continues determining channel estimates based on the signals from the other wireless device, and wherein when at least one of the antenna configuration at the wireless device has changed and the channel has changed as determined by the orthogonality being less than the orthogonality threshold, then the wireless device sends the advance notice to the other wireless device to trigger an update of a beamforming matrix.

11. A wireless device for performing beamformee functions, the wireless device comprising:

a plurality of antennas; and a control circuit coupled to the plurality of antennas, the control circuit configured to determine when to trigger an advance notice, the control circuit configured to perform steps including:

determining channel estimates based on signals from another wireless device, the channel estimates including channel state information, a beamforming matrix, or a compressed beamforming matrix;

determining whether an antenna configuration at the wireless device has changed; and determining whether a channel between the wireless device and the other wireless device has changed based on at least one of a correlation between a stored channel estimate and a current channel estimate, and an orthogonality of an estimated channel matrix, wherein when the antenna configuration at the wireless device has not changed and the channel has not changed as determined by at least one of the correlation not being less than a correlation threshold and the orthogonality not being less than an orthogonality threshold, then the wireless device continues determining channel estimates based on the signals from the other wireless device, and wherein when at least one of the antenna configuration at the wireless device has changed and the channel has changed as determined by at least one of the correlation being less than the correlation threshold and the orthogonality being less than the orthogonality threshold, then the wireless device sends the advance notice to the other wireless device to trigger an update of a beamforming matrix.

12. A wireless device for performing beamformer functions, the wireless device comprising:

a plurality of antennas;

a beamforming unit coupled to the plurality of antennas; and a control circuit coupled to the beamforming unit, the control circuit configured to determine when to trigger a sounding packet, the control circuit configured to perform steps including:

determining channel estimates based on predetermined signals from a non-beamforming wireless device, the predetermined signals including channel state information, a beamforming matrix, or a compressed beamforming matrix;

determining whether an antenna configuration at the wireless device has changed;

determining whether a channel between the wireless device and the non-beamforming wireless device has changed based on a correlation of a stored channel estimate and a current channel estimate, wherein when the antenna configuration at the wireless device has not changed and the channel has not changed as determined by the correlation not being less than a correlation threshold, then the wireless device continues determining channel estimates based on the predetermined signals from the non-beamforming wireless device, and wherein when at least one of the antenna configuration at the wireless device has changed and the channel has changed as determined by the correlation being less than the correlation threshold, then the wireless device triggers an update of a beamforming matrix.

13. A method for determining when a beamforming matrix is updated in a wireless communications system, the wireless communications system including a beamformer and a beamformee, the method comprising:

in the beamformee, determining channel estimates based on signals from the beamformer, the channel estimates including channel state information, a beamforming matrix, or a compressed beamforming matrix;

determining whether an antenna configuration at the beamformee has changed; and determining whether a channel between the beamformer and the beamformee has changed based on a correlation between a stored channel estimate and a current channel estimate, wherein when the antenna configuration at the beamformee has not changed and the channel has not changed as determined by the correlation not being less than a correlation threshold, then the beamformee continues determining channel estimates based on the signals from the beamformer, and wherein when at least one of the antenna configuration at the beamformee has changed and the channel has changed as determined by the correlation being less than the correlation threshold, then the beamformee sends a sounding packet to the beamformer to trigger an update of a beamforming matrix.

* * * * *